(12) United States Patent
Iqbal

(10) Patent No.: US 9,667,867 B2
(45) Date of Patent: May 30, 2017

(54) LOW POWER SMART IMAGE CAPTURE

(71) Applicant: OMNIVISION TECHNOLOGIES, INC., Santa Clara, CA (US)

(72) Inventor: Jameerrul Iqbal, Bangalore (IN)

(73) Assignee: OmniVision Technologies, Inc., Santa Clara, CA (US)

( * ) Notice: Subject to any disclaimer, the term of this patent is extended or adjusted under 35 U.S.C. 154(b) by 0 days.

(21) Appl. No.: 14/673,497

(22) Filed: Mar. 30, 2015

(65) Prior Publication Data
US 2016/0295113 A1  Oct. 6, 2016

(51) Int. Cl.
*H04N 5/222* (2006.01)
*H04N 5/232* (2006.01)
*H04N 1/40* (2006.01)

(52) U.S. Cl.
CPC ..... *H04N 5/23245* (2013.01); *H04N 1/40068* (2013.01); *H04N 5/23241* (2013.01); *H04N 5/23293* (2013.01)

(58) Field of Classification Search
CPC .. H04N 5/3698; H04N 5/23241; H04N 5/232; H04N 5/23293; H04N 5/23219; G06F 1/3203; G06T 3/4053
USPC ...... 348/294, 211.2, 333.01, 333.02, 333.04, 348/333.13, 333.11, 376; 396/301
See application file for complete search history.

(56) References Cited

U.S. PATENT DOCUMENTS

| | | | | |
|---|---|---|---|---|
| 6,031,999 A * | 2/2000 | Ogawa | ................. | G03B 7/26 396/277 |
| 2003/0227390 A1* | 12/2003 | Hung | ................. | G01R 31/3648 340/636.1 |
| 2004/0141070 A1* | 7/2004 | Chiku | ................. | H04N 5/23293 348/231.99 |
| 2005/0052553 A1* | 3/2005 | Kido | ................. | H04N 3/1562 348/296 |
| 2006/0274192 A1* | 12/2006 | Higuchi | ................. | H04N 5/232 348/370 |
| 2007/0229686 A1* | 10/2007 | Hiyama | ................. | H04N 5/3456 348/294 |
| 2009/0179765 A1* | 7/2009 | Nymark | ................. | H04M 1/72519 340/669 |

(Continued)

OTHER PUBLICATIONS

TW Patent Application No. 105106581—Taiwanese Office Action and Search Report, issued Dec. 16, 2016, with English Translation, 9 pages.

*Primary Examiner* — Xi Wang
(74) *Attorney, Agent, or Firm* — Blakely Sokoloff Taylor & Zafman LLP

(57) ABSTRACT

A method of capturing an image includes reducing a resolution of the image to be captured by an image sensor of an electronic device to a low power reduced resolution if a checked battery level of the electronic device is less than a battery threshold level. A live preview of the image to be captured by the image sensor on a display of the electronic device is disabled if the battery level of the electronic device is less than a battery threshold level. The image is captured at the low power reduced resolution of the image sensor if the battery level of the electronic device is less than the battery threshold level. A low power feedback notification is provided from the electronic device without displaying the captured image after the image is captured if the battery level of the electronic device is less than the battery threshold level.

16 Claims, 4 Drawing Sheets

(56) References Cited

U.S. PATENT DOCUMENTS

| | | | | |
|---|---|---|---|---|
| 2010/0302411 A1* | 12/2010 | Ueda | ...................... | G03B 19/12 |
| | | | | 348/234 |
| 2011/0001870 A1* | 1/2011 | Yamamoto | ............... | G02B 7/38 |
| | | | | 348/351 |
| 2012/0050551 A1* | 3/2012 | Ishibashi | ............ | H04N 21/4425 |
| | | | | 348/208.1 |
| 2013/0027575 A1* | 1/2013 | Cho | ........................ | G01S 17/89 |
| | | | | 348/222.1 |
| 2013/0155286 A1* | 6/2013 | Yumisaki | ........... | H04N 5/23241 |
| | | | | 348/231.99 |
| 2013/0235222 A1* | 9/2013 | Karn | .................. | H04N 5/23203 |
| | | | | 348/211.2 |
| 2014/0267021 A1* | 9/2014 | Lee | ...................... | G06F 3/0304 |
| | | | | 345/156 |
| 2015/0042480 A1* | 2/2015 | Tan | .................... | G01R 31/3651 |
| | | | | 340/636.15 |

\* cited by examiner

LOW POWER SMART IMAGE CAPTURE

BACKGROUND INFORMATION

Field of the Disclosure

This invention is related to image capture, and more particularly, to acquiring images with electronic devices in low power conditions or when electronic device is operating in a low power mode to conserve power.

Background

Portable electronic devices have become ubiquitous. Many electronic devices include image sensors, which are included in a wide variety of electronic devices such as handheld digital cameras, mobile phones, tablet computers, as well as other portable electronic devices. The technology used to manufacture the image sensors that are included in portable electronic devices, such as for example complementary metal-oxide-semiconductor (CMOS) image sensors (CIS), has continued to advance at a great pace. The demands for higher resolution and lower power consumption have encouraged the further miniaturization and integration of these image sensors.

Some of the challenges faced by portable electronic devices is extending battery life of the mobile devices that include the electronic cameras, as well as the ability to continue acquiring images, even when the mobile devices are in critical low power battery conditions. Some mobile phones and tablet computers now include so-called features that are being characterized as low power mode. However, the onboard digital cameras that are included in these mobile phones and tablet computers are not part of the low power mode because there is no control over the power that is consumed by the image sensors included in these portable electronic devices during low power mode.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
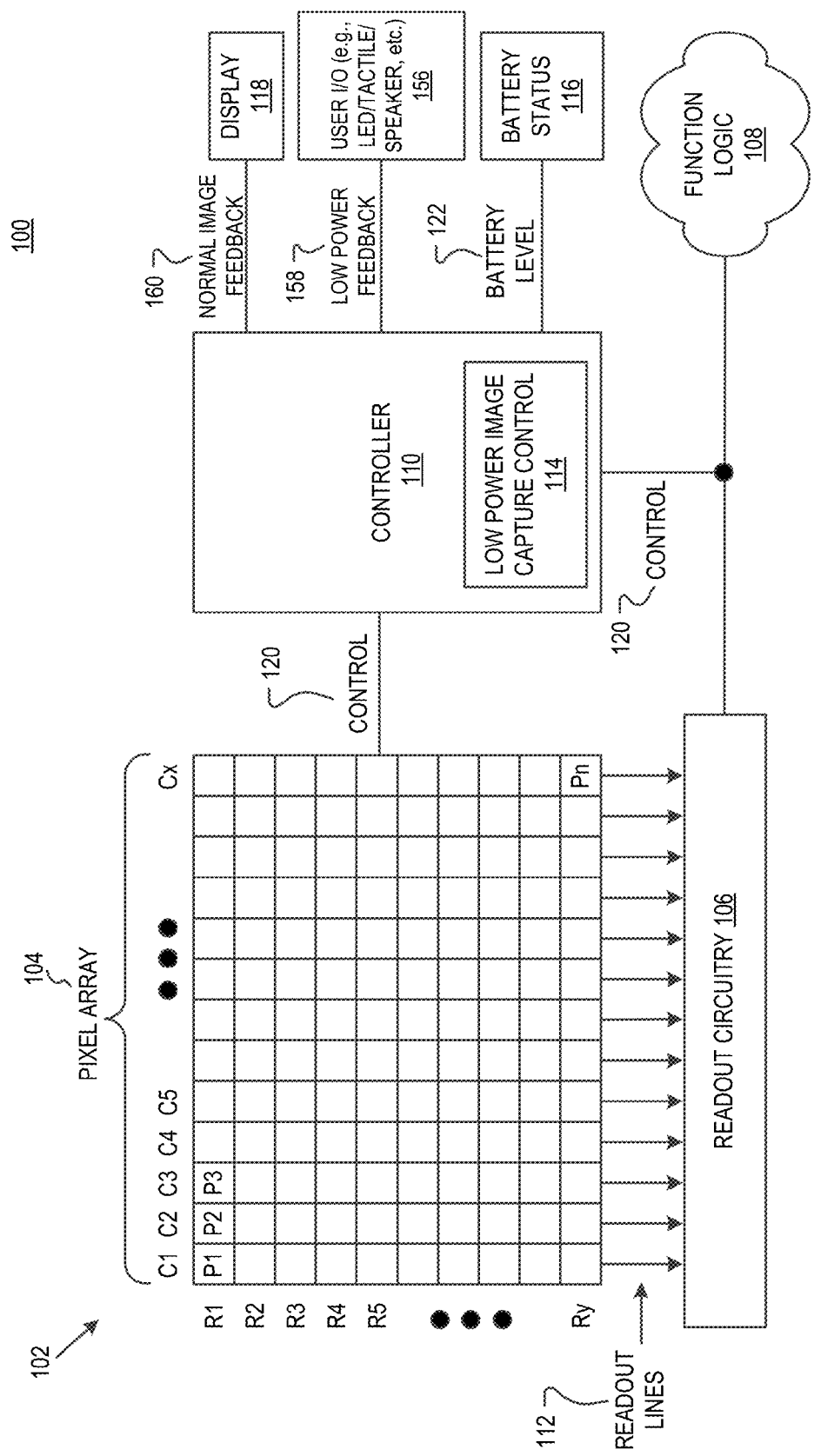
FIG. 1 is a diagram illustrating one example of an imaging system included in an electronic device having an image sensor featuring a low power image capture mode in accordance with the teachings of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Examples of an electronic device including an image sensor from which low power reduced resolution images may be captured during a low power mode are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Throughout this specification, several terms of art are used. These terms are to take on their ordinary meaning in the art from which they come, unless specifically defined herein or the context of their use would clearly suggest otherwise. For example, the term "or" is used in the inclusive sense (e.g., as in "and/or") unless the context clearly indicates otherwise.

As will be shown, examples of a battery powered portable electronic device including an image sensor with a low power smart capture mode are disclosed. As will be discussed, the way images are captured using the low power smart capture depends upon the battery condition or electronic device mode of operation. The image is captured with either a normal (e.g., maximum) resolution of the image sensor, or with a low power reduced resolution depending on the battery condition or electronic device mode of operation. In various examples, the low power reduced resolution can also be varied further to different possible low power reduced resolutions depending on the battery condition. As such, the battery life of the electronic device can be extended, and low power reduced resolution images can be captured under critically low battery conditions, which would otherwise not have been possible with an image sensor attempting to capture normal resolution images under low battery conditions. In various examples, the live preview and the display of captured images on the electronic device may also be disabled to further extend battery life in an electronic device in accordance with the teachings of the present invention. For instance, in these examples, a blank virtual screen may be displayed on the display of the electronic device instead of a live preview, and/or a low power feedback notification may be provided to a user to confirm image capture instead of displaying the actual captured image to further extend battery life in accordance with the teachings of the present invention.

To illustrate, FIG. 1 is a diagram illustrating one example of a portion of an imaging system 102 included in an electronic device 100 having an image sensor featuring a low power image capture mode in accordance with the teachings of the present invention. In the depicted example, the imaging system 102 includes a pixel array 104 included in an image sensor, with readout circuitry 106, and function logic 108. In the illustrated example, a controller 110, which includes control circuitry, is coupled to the pixel array 104 and readout circuitry 106 to control operation of the pixel array 104 and readout circuitry 106.

In one example, pixel array 104 is included in an image sensor that includes a two dimensional (2D) array of pixel cells (e.g., pixel cells P1, P2, P3, . . . Pn). In various examples, pixel array 104 may be implemented in a front side illuminated image sensor or in a back side illuminated image sensor. As illustrated in the depicted example, each pixel cell in pixel array 104 is arranged into a row (e.g., rows R1 to Ry) and a column (e.g., column C1 to Cx) to acquire image data for an image of a person, place, object, etc., which can then be used to render a 2D image of the person, place, object, etc., in accordance with the teachings of the present invention. For instance, in one example, incident light is directed from an object to the each pixel cell in pixel array 104. In one example, a color filter array may be disposed over the array of pixel cells to assign color information to each of the underlying pixel cells. In one example, an array of microlenses may also be disposed over the pixel array 104 to direct the incident light into each pixel cell of pixel array 104. Image charge is generated in each pixel cell in response to the incident light.

In one example, controller 110 is coupled to the pixel cells in pixel array 104 and readout circuitry 106 to control operational characteristics of pixel array 104 and readout circuitry 106. For example, controller 110 may generate a shutter signal and other control signals 120 coupled to pixel array 104 and readout circuitry 106 to control image acquisition. In one example, the shutter signal may be a global shutter signal for simultaneously enabling all pixel cells included in pixel array 104 to simultaneously capture their respective image data during a single acquisition window. In another example, the shutter signal may be a rolling shutter signal such that each row, column, or group of pixels is sequentially enabled during consecutive acquisition windows.

After the pixel array 104 is exposed to incident light and the corresponding image charges are generated in the pixel cells, image data that is generated in response to the image charge is read out by readout circuitry 106 through readout lines 112, and is then transferred to function logic 108. As will be discussed in greater detail below, in one example, all of the plurality of pixel cells included in pixel array 104 may be read out by readout circuitry 106 to provide a normal resolution image to be captured by pixel array 104.

However, in one example, a subset of the plurality of pixel cells included in pixel array 104 may be read out by readout circuitry 106 to provide a low power reduced resolution of the image to be captured by pixel array 104 in accordance with the teachings of the present invention. In other words, in one example, if there is sufficient battery power available for electronic device 100, all of the plurality of the pixel cells included in pixel array 104 may be read out to capture a normal resolution image. However, if the available battery power available to electronic device 100 drops below a battery threshold or electronic device mode of operation requires the camera to operate in low power mode, only some of the pixel cells of pixel array 104 are read out to capture a low power reduced resolution image to conserve battery power in electronic device 100 in accordance with the teachings of the present invention. For instance, in such an example, a fewer number of rows and columns of pixel cells are captured, which reduces that amount of power required to capture the low power reduced resolution image in accordance with the teachings of the present invention. As such, the battery life in electronic device 100 may be extended, and it is now therefore possible for additional images to be captured by electronic device 100 under critical low battery conditions in accordance with the teachings of the present invention.

In one example, multiple battery thresholds may be used to provide even more control of battery consumption in accordance with the teachings of the present invention. For instance, as shown in the example provided with Table 1 below, as the available battery power decreases, the low power reduced resolution of the image that is captured under low power conditions is also reduced accordingly to further reduce the amount of power that is consumed in order to capture an image in accordance with the teachings of the present invention.

TABLE 1

Example Battery Thresholds and Resolutions of Captured Images

| Battery Level (Available Power for Capture) | Image Sensor Capture Resolution |
|---|---|
| 300 mW | Normal resolution capture |
| 120 mW | 640 × 480 |
| 24 mW | 240 × 136 |

The example depicted in Table 1 above shows that if a check of a battery status 116 of the electronic device 100 returns a battery level 122 indicates that the available power for capture in electronic device 100 is greater than or equal to 300 mW, then a normal resolution (e.g., a maximum resolution) image may be captured from the pixel array 104. However, if the battery level 122 that indicates that the available power for capture in electronic device 100 is less than 300 mW, but is greater than or equal to 120 mW, then a low power reduced resolution image having a resolution of 640×480 is captured from the pixel array 104 in accordance with the teachings of the present invention. Furthermore, in one example, if the battery level 122 indicates that the available power for capture in electronic device 100 is less than 120 mW, but is still at least greater than or equal to 24 mW, then a further low power reduced resolution image having a resolution of 240×136 is captured from the pixel array 104 in accordance with the teachings of the present invention. It appreciate that in other examples a different number of battery thresholds may be utilized, and that the specific example battery levels and resolutions provided in Table 1 are for explanation purposes only, and that other battery levels and/or resolutions may be utilized in accordance with the teachings of the present invention.

To illustrate, referring back to the example depicted in FIG. 1, controller 110 includes a low power image capture control block 114 to help control the operation of at least some of the elements of the electronic device 100 during a low power mode in accordance with the teachings of the present invention. In the illustrated example, battery status block 116 is included in electronic device 100 to provide battery level information 122, which may include a signal representative of the amount of remaining available battery power for electronic device 100 as discussed above or signal representative how much power the camera can consume for this capture. FIG. 1 also illustrates that that controller 110 may also be coupled to a display 118 included in electronic device 100. For instance, in one example, electronic device 100 may be a mobile phone, tablet computer, handheld digital cameras, or other type of portable electronic device that includes a display 118. In one example, display 118 may be used during a normal power mode to provide normal image feedback 160 to a user. For instance, normal image feedback 160 may for example be the display of a captured image to a user to confirm to the user that the image has been captured during a normal power mode of the electronic device 100 in accordance with the teachings of the present invention.

Continuing with the example depicted in FIG. 1 a user input/output (I/O) block 156 may also be included in electronic device 100, from which input may be received from a user of electronic device 100, and through which output may be provided to the user of electronic device 100 in accordance with the teachings of the present invention. For instance, in one example user I/O block 156 may include, or be coupled, to one or more buttons, keys, touchscreens, or other input devices to receive one or more inputs from a user, such as for example various commands from a touchscreen or buttons to invoke and control camera functions of electronic device 100 in accordance with the teachings of the present invention.

In addition, user I/O block 156 may also include or be coupled to one or more lights or indicators (e.g., light emitting diodes (LEDs), liquid crystal displays (LCDs), vibrators, tactile feedback elements, motors, speakers, buzzers, or any other low power output devices to provide feedback or other outputs or notifications to a user of electronic device 100 in accordance with the teachings of the present invention. In one example, low power feedback 158 may be provided to a user to confirm to the user that electronic device 100 is in a lower power mode, and/or to confirm that a low power reduced resolution image has been captured during a low power mode of the electronic device 100 in accordance with the teachings of the present invention. In one example, it is appreciated that providing low power feedback 158 through user I/O block 156 to confirm the capture of an image to the user that a low power reduced resolution image has been captured consumes less power in electronic device 100 than providing normal image feedback 160 by displaying the captured image on display 118 in accordance with the teachings of the present invention. Furthermore, in one example, a low power indicator can be used to help indicate to the user that electronic device is in a low power mode to capture an image instead of providing a live preview of an image to be captured on display 118 to further conserve battery power in accordance with the teachings of the present invention.

In various examples, readout circuitry 106 may include circuitry such as for example amplification circuitry, analog-to-digital (ADC) conversion circuitry, or the like. Function logic 108 may include digital circuitry and may simply store the image data, or may even manipulate the image data with image signal processing techniques to apply post image effects (e.g., crop, rotate, remove red eye, adjust brightness, adjust contrast, or otherwise). In one example, readout circuitry 106 may read out a row of image data at a time along the readout lines (illustrated), or may read out the image data using a variety of other techniques (not illustrated), such as for example a serial read out or a full parallel read out of all pixels simultaneously.

Figure 2:
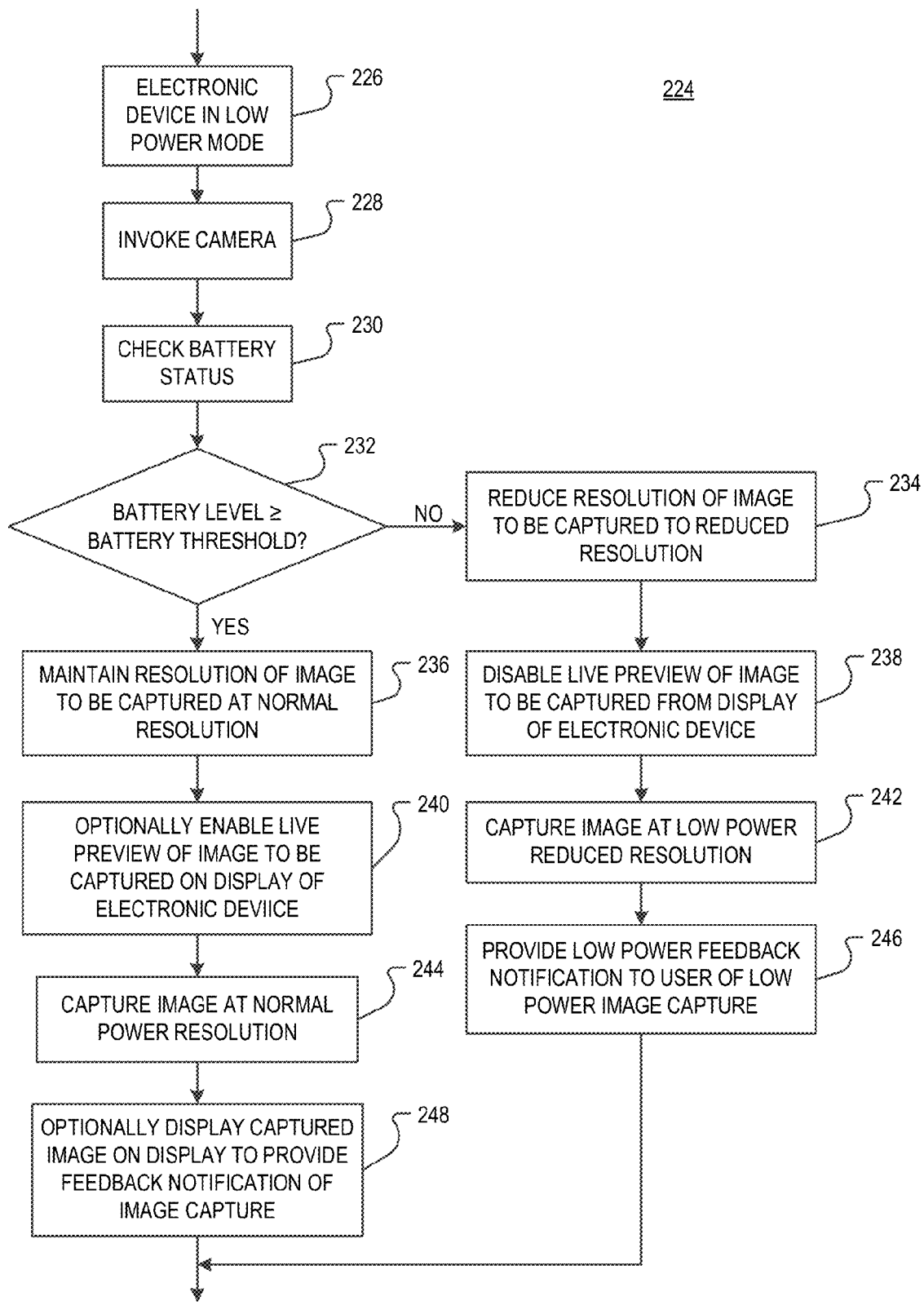
FIG. 2 is an example flow chart diagram that illustrates the processing for low power image capture in an electronic device in accordance with the teachings of the present invention.

FIG. 2 is an example flow chart diagram 224 that illustrates the processing for low power image capture in an electronic device in accordance with the teachings of the present invention. In one example, the electronic device and associated elements referred to in flow chart diagram 224 below may be examples of the example electronic device 100 and associated elements discussed above in FIG. 1. Referring back to flow chart diagram 224, process block 226 indicates that the electronic device is in a low power mode. In one example, the low power mode may be manually activated by the user, or may be activated automatically by the device without user intervention in response to a low battery level. Process block 228 indicates that the camera is invoked. For instance, in an example in which the electronic device is a mobile phone, the camera function of the mobile phone may be activated in response to a user tapping on the appropriate icon on a touchscreen, or by pressing a corresponding button on the mobile phone. Processing block 230 indicates that the battery status of the electronic device is now checked to determine the amount of available power for image capture. At decision block 232, the battery level is compared to a battery threshold, such as for example one or more of the example battery thresholds listed in Table 1 above.

Process block 234 indicates that if decision block 232 determines that the battery level is less than the battery threshold, then the resolution of the image to be captured is reduced to a reduced resolution in order to reduce battery consumption. In addition, process block 238 indicates that the live preview of the image to be captured may therefore also be disabled from being displayed on the display to further reduce battery consumption, because the live preview on the display would consume a non-trivial amount of power. For instance, in one example, the display may simply have a virtual screen, such as for example a blank screen or a static image or message that indicates to the user that the electronic device is in low power mode. Process block 242 indicates that the image is then captured at the low power reduced resolution. Process block 246 indicates that after the image is captured at the low power reduced resolution, a low power feedback notification may be provided to the user to confirm to the user that the image has been captured. In various examples, it is appreciated that the low power feedback notification may be provided to the user using a variety of different low power techniques, such as for example, illuminating a light, such as a light emitting diode (LED), or providing haptic feedback to the user, or vibrating or buzzing the electronic device, or emitting a confirmation sound from the electronic device, or the like. It is appreciated that the example low power feedback notification techniques mentioned are just some examples, and that all of the various techniques mentioned above consume less power than displaying the captured image on the display of the electronic device to confirm to the user that the image has been captured.

If decision block 232 instead determines that the battery level is greater than or equal the battery threshold, then processing instead continues to processing block 236, which indicates that the resolution of the image to be captured is maintained at the normal resolution of the image sensor since there is sufficient battery power available. Accordingly, processing block 240 indicates that there may optionally be live preview of the image to be captured, which allows the user to preview and compose the image to be captured by the electronic device on the display of the electronic device prior to capturing the image. However, in one example the live preview may optionally not be enabled to conserve power in a low power mode, and instead a simple virtual screen such as for example a blank screen or a static image or message may be displayed that indicates to the user that the electronic device image capture is in progress. Thus, in one example, the live preview may optionally be enabled if the battery level of the electronic device is greater than or equal to the battery threshold level or if the electronic device is operating in the low power mode. Process block 244 indicates that the image is then captured at the normal resolution, which in one example may be the maximum resolution available on the image sensor. Thus, in one example, the image may be captured at normal resolution if the battery level of the electronic device is greater than or equal to the battery threshold level or if the electronic device is operating in the low power mode. Process block 248 indicates that after the image is captured at the normal resolution, the captured image may optionally be displayed on a viewfinder or display of the electronic device to provide a feedback notification of the image capture to the user, which confirms that the image has been captured. However, in one example the captured image may optionally not be displayed to conserve power in a low power mode, and instead a simple virtual screen such as for example a blank screen or a static image or message may be displayed that indicates to the user that the image has been captured.

Figure 3:
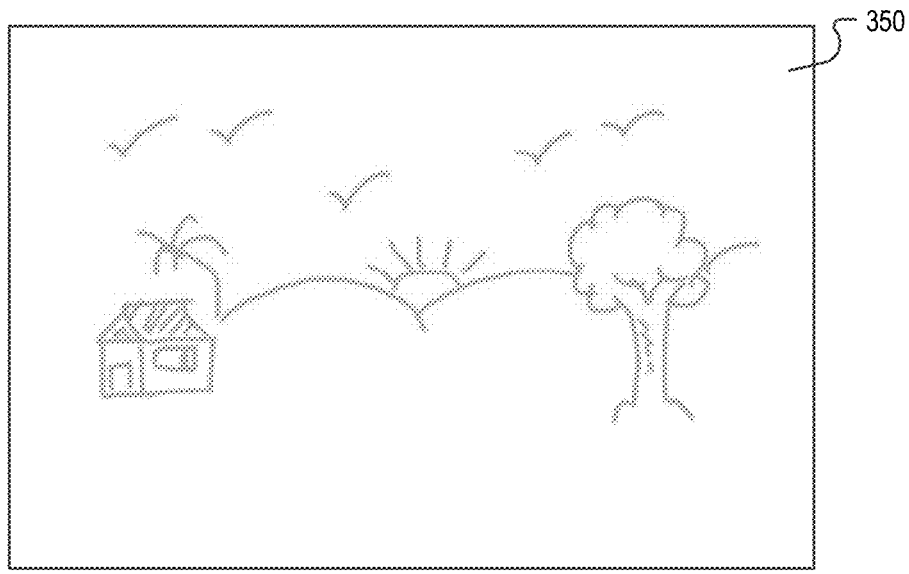
FIG. 3 is an illustration of an example actual scene from which an image may be captured using an example electronic device in low power mode in accordance with the teachings of the present invention.

FIGS. 3-6 provide illustrations of an example electronic device in operation, such as for example the electronic devices described above with respect to FIGS. 1-2 in accordance with the teachings of the present invention. In particular, FIG. 3 is an illustration of an actual scene 350 from which an image may be captured using an example electronic device in low power mode in accordance with the teachings of the present invention. In the illustrated example, the electronic device is in a low power mode, and therefore captures an image with a low power reduced resolution in accordance with the teachings of the present invention.

Figure 4:
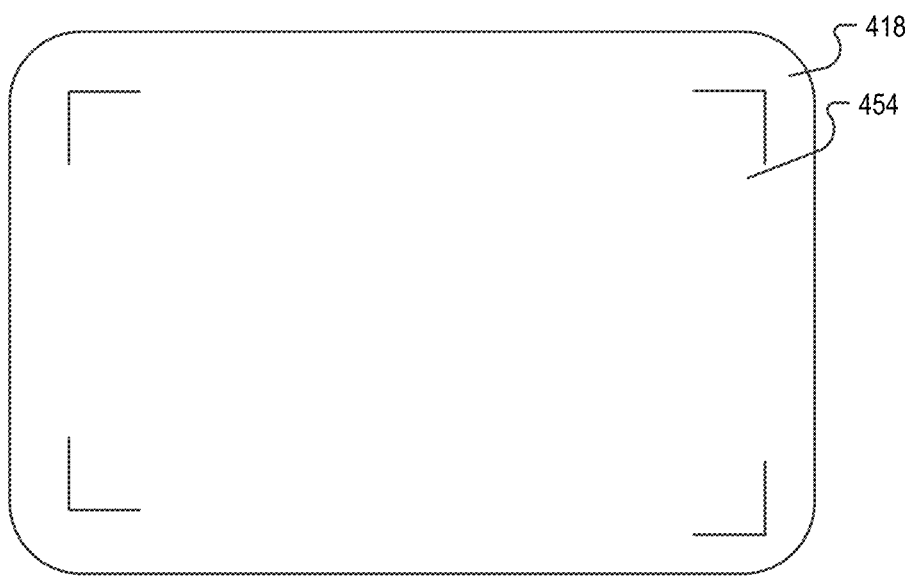
FIG. 4 is an illustration of a display of an example electronic device displaying an example virtual screen during a low power image capture mode in accordance with the teachings of the present invention.

FIG. 4 is an illustration of a display 418 of the example electronic device displaying an example virtual screen 454 during a low power image capture mode in accordance with the teachings of the present invention. As shown in the example depicted in FIG. 4, instead of displaying a live preview of an image to be captured, which would consume a non-trivial amount of power, a virtual screen 454 is displayed, which consumes less power in accordance with the teachings of the present invention. In the example depicted in FIG. 4, the virtual screen 454 is a blank screen, or an otherwise static image or message, which indicates that the electronic device is in low power mode and consumes less power in accordance with the teachings of the present invention.

Figure 5:
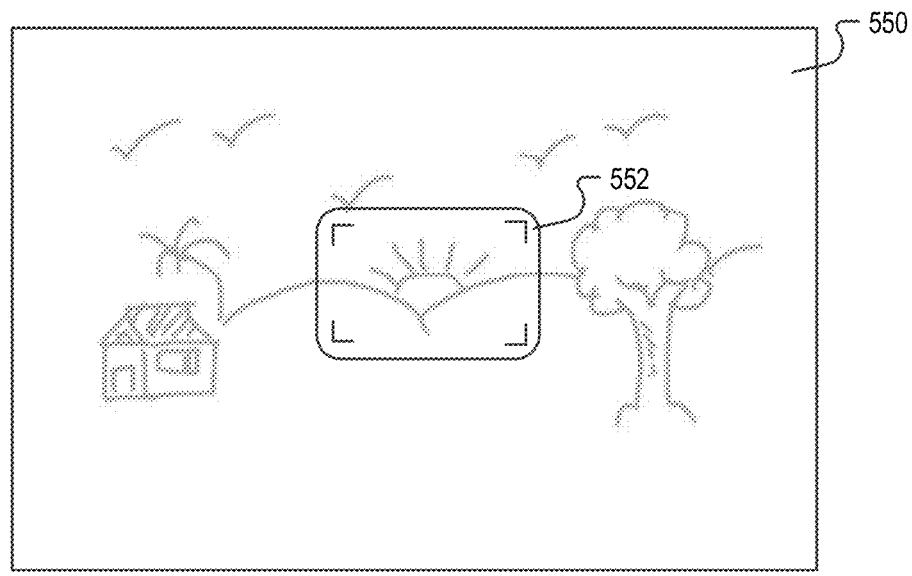
FIG. 5 is an illustration showing an example portion of an example actual scene from which a low power reduced resolution image may be captured using an example electronic device in low power mode in accordance with the teachings of the present invention.

FIG. 5 is an illustration showing an example portion 552 of an actual scene 550 from which a low power reduced or normal resolution image may be captured using an example electronic device in low power mode in accordance with the teachings of the present invention. For instance, even though the live preview is disabled in low power mode, as illustrated for example in FIG. 4, a reduced or normal resolution image may still be captured from actual scene 550 in low power mode, as indicated with portion 552 in accordance with the teachings of the present invention.

Figure 6:
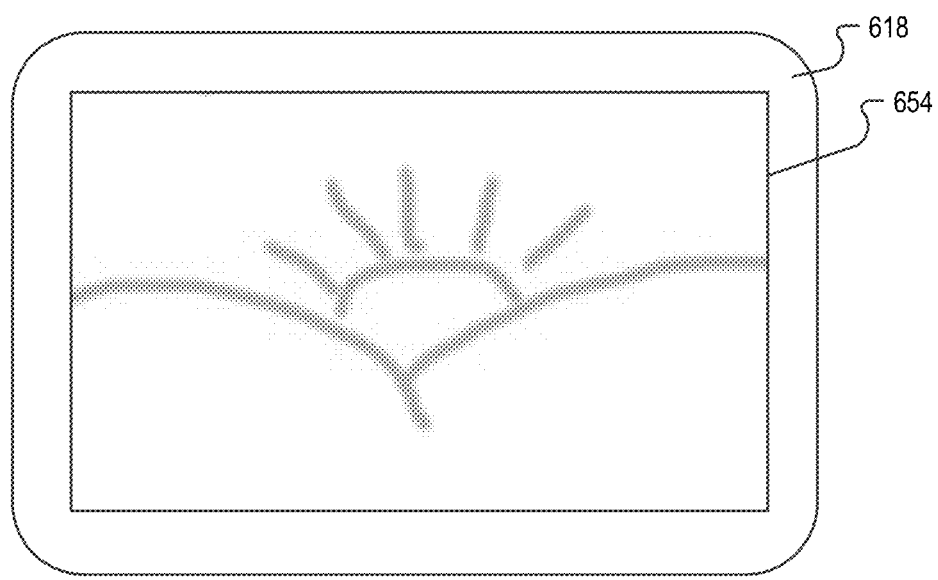
FIG. 6 is an illustration of a display of an example electronic device displaying an example low power reduced resolution image in a gallery mode of the electronic device after normal power has been restored to the electronic device in accordance with the teachings of the present invention.

FIG. 6 is an illustration of a display 618 of an example electronic device displaying an example low power reduced or normal resolution image 654 after normal power has been restored to the electronic device in accordance with the teachings of the present invention. For example, once the battery of the electronic device has been recharged or restored, the low power reduced resolution image 654 that was previously captured under low power battery conditions may still be displayed, for example in a gallery mode, on electronic device in accordance with the teachings of the present invention. It is appreciated that without a low power mode, the capture of low power reduced resolution image 654 may not have otherwise been possible with the low amount of available battery power in electronic device. Accordingly, with the low power smart image capture feature of the electronic device, the capture of images is possible with the electronic device in accordance with the teachings of the present invention.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of capturing an image with an electronic device, comprising:
   checking a battery status of the electronic device;
   reducing a resolution of the image to be captured by an image sensor of the electronic device to a low power reduced resolution when a battery level of the electronic device is less than a battery threshold level;
   disabling, without turning off the electronic a live preview of the image to be captured by the image sensor on a display of the electronic device when the battery level of the electronic device is less than the battery threshold level;
   displaying a static low power screen on the display of the electronic device instead of displaying the live preview of the image to be captured by the image sensor on the display of the electronic device when the battery level of the electronic device is less than the battery threshold level;
   capturing the image at the low power reduced resolution of the image sensor when the battery level of the electronic device is less than the battery threshold level and simultaneously displaying, on the entire display of the electronic device, the static low power screen; and
   providing a low power feedback notification from the electronic device without displaying the captured image to indicate that the image is captured when the battery level of the electronic device is less than the battery threshold level.

2. The method of capturing the image of claim 1 wherein said providing the low power feedback notification from the electronic device comprises providing haptic feedback to a user with a low power tactile feedback element included in the electronic device.

3. The method of capturing the image of claim 2 wherein the low power tactile feedback element included in the electronic comprises a vibrating element.

4. The method of capturing the image of claim 1 wherein said providing the low power feedback notification from the electronic device comprises providing low power visual feedback from the electronic device.

5. The method of capturing the image of claim 4 wherein said providing the low power visual feedback from the electronic device comprises illuminating a light.

6. The method of capturing the image of claim 1 wherein said providing the low power feedback notification from the electronic device comprises providing audio feedback from electronic device.

7. The method of capturing the image of claim 1 wherein the battery threshold level is a first battery threshold level, the method further comprising:
  reducing the resolution of the image to be captured by the image sensor of the electronic device to a second low power reduced when the battery level of the electronic device is less than a second battery threshold level, wherein the second battery threshold is less than the first battery threshold, and wherein the second reduced lower power resolution is less than the first reduced lower power resolution;
  capturing the image at the second low power reduced resolution of the image sensor when the battery level of the electronic device is less than the second battery threshold level; and
  providing the low power feedback notification from the electronic device without displaying the captured image after the image is captured when the battery level of the electronic device is less than the second battery threshold level.

8. An image sensing electronic device, comprising:
  a plurality of pixel cells arranged in a pixel array of an image sensor, wherein the plurality of pixel cells are arranged to provide a normal resolution image to be captured by the image sensor, wherein a subset of the plurality of pixel cells are arranged to provide a low power reduced resolution of the image to be captured by the image sensor;
  readout circuitry coupled to the pixel array to readout the normal resolution image from the plurality of pixel cells when a battery level of the electronic device is greater than or equal to a battery threshold level, wherein the readout circuitry is further coupled to readout the low power reduced resolution image from the subset of the plurality of pixel cells when the battery level of the electronic device is less than the battery threshold level;
  a controller coupled to the pixel array and the readout circuitry to control operation of the pixel array and the readout circuitry, wherein the controller includes a low power image capture control circuitry to control operation of the pixel array and the readout circuitry when the battery level of the electronic device is less than the battery threshold level;
  user input/output (I/O) circuitry coupled to the controller, wherein the user I/O circuitry is coupled to provide a low power feedback notification from the electronic device to confirm a capture of the low power reduced resolution of the image when the battery level of the electronic device is less than the battery threshold level; and
  a display coupled to the controller, wherein the controller is coupled to display a static low power screen on the display of the electronic device and disable, without turning off the electronic device, a live preview of the image to be captured by the image sensor on the display of the electronic device when the battery level of the electronic device is less than the battery threshold level, and wherein displaying the static low power screen occurs on the entire display of the electronic device when capturing the image with the image sensing electronic device.

9. The image sensing electronic device of claim 8 further comprising function logic circuitry coupled to the readout circuitry to store image data received from the pixel array.

10. The image sensing electronic device of claim 8 wherein the display is coupled to display a live preview of the normal resolution image from the plurality of pixel cells when the battery level of the electronic device is greater than or equal to the battery threshold level, wherein the display is further coupled to display the normal resolution image from the plurality of pixel cells to provide a normal power feedback notification when the battery level of the electronic device is greater than or equal to the battery threshold level.

11. The image sensing electronic device of claim 8 wherein the user I/O circuitry includes a low power tactile feedback element coupled to provide haptic feedback to a user without displaying a captured image after the image is captured when the battery level of the electronic device is less than the battery threshold level.

12. The image sensing electronic device of claim 8 wherein the user I/O circuitry includes a low power visual feedback element coupled to provide visual feedback to a user without displaying a captured image after the image is captured when the battery level of the electronic device is less than the battery threshold level.

13. The image sensing electronic device of claim 12 wherein the low power visual feedback element includes a light.

14. The image sensing electronic device of claim 8 wherein the user I/O circuitry includes a low power audio feedback element coupled to provide audio feedback to a user without displaying a captured image after the image is captured when the battery level of the electronic device is less than the battery threshold level.

15. The image sensing electronic device of claim 14 wherein the low power audio feedback element includes a speaker.

16. The image sensing electronic device of claim 8 wherein the battery threshold level is a first battery threshold level, wherein the subset of the plurality of pixel cells is a first subset of the plurality of pixel cells, the image sensing electronic device further including a second subset of the plurality of pixel cells arranged to provide a second low power reduced resolution of the image to be captured by the image sensor, wherein the second subset of the plurality of pixel cells is smaller than the subset of the plurality of pixel cells, and wherein the readout circuitry is further coupled to readout the second low power reduced resolution image from the second subset of the plurality of pixel cells when the battery level of the electronic device is less than a second battery threshold level.

* * * * *